United States Patent [19]

Millar et al.

[11] Patent Number: 5,269,379
[45] Date of Patent: Dec. 14, 1993

[54] AUTOMATED SOD HARVESTING APPARATUS

[75] Inventors: David B. Millar, New Carlisle, Ind.; Donald G. Kilgore, Berrien Springs, Mich.

[73] Assignee: Red Hen Turf Farm Inc., New Carlisle, Ind.

[21] Appl. No.: 610,393

[22] Filed: Nov. 7, 1990

[51] Int. Cl.$^5$ .................................... A01B 45/04
[52] U.S. Cl. .................................... 172/19; 414/911; 414/792.5; 414/789.7; 414/792.9
[58] Field of Search .................. 172/19, 20; 414/501, 414/502, 789.7, 792.5, 792.9

[56] References Cited

U.S. PATENT DOCUMENTS

| | | | |
|---|---|---|---|
| 3,164,211 | 1/1965 | Scott . | |
| 3,235,011 | 2/1966 | Pasinski et al. . | |
| 3,464,641 | 9/1969 | Brouwer . | |
| 3,509,944 | 5/1970 | Brouwer et al. . | |
| 3,540,535 | 11/1970 | Brouwer et al. . | |
| 3,590,927 | 7/1971 | Brouwer et al. . | |
| 3,653,448 | 4/1972 | Morrill . | |
| 3,664,432 | 5/1972 | Nunes, Jr. | 172/19 |
| 3,672,452 | 6/1972 | Miner | 172/19 |
| 3,675,793 | 7/1972 | Wetzel | 172/20 |
| 3,790,096 | 2/1974 | Brouwer . | |
| 3,812,918 | 5/1974 | Beck . | |
| 3,877,584 | 4/1975 | Holcombe . | |
| 3,887,013 | 6/1975 | Helberg | 172/20 |
| 3,982,711 | 9/1976 | Bradley et al. . | |
| 4,015,666 | 4/1977 | Brouwer et al. . | |
| 4,018,287 | 4/1977 | Brouwer . | |
| 4,029,152 | 6/1977 | Gerrits . | |
| 4,162,709 | 7/1979 | Wilson | 172/20 |
| 4,162,726 | 7/1979 | Hudson et al. | 172/20 |
| 4,294,316 | 10/1981 | Hedley et al. | 172/20 |
| 4,345,659 | 8/1982 | Arnold . | |
| 4,396,335 | 8/1983 | Brandstetter et al. . | |
| 4,406,570 | 9/1983 | Duncan et al. . | |
| 4,571,149 | 2/1986 | Soroka et al. . | |
| 4,658,715 | 4/1987 | Stobb | 414/792.9 |
| 4,773,810 | 9/1988 | Nishimura et al. . | |
| 4,777,890 | 10/1988 | Raymond . | |
| 4,828,040 | 5/1989 | Schumacher | 172/19 |
| 4,832,130 | 5/1989 | Brouwer et al. . | |
| 4,903,778 | 2/1990 | Brouwer et al. . | |
| 4,944,352 | 7/1990 | Brouwer et al. . | |
| 4,966,239 | 10/1990 | Hutchison | 172/20 |
| 4,997,336 | 3/1991 | Galbani | 414/911 |
| 5,028,203 | 7/1991 | Masini | 414/792.9 |
| 5,087,169 | 2/1992 | Tübke | 414/792.9 |

OTHER PUBLICATIONS

The Brouwer Auto-Steer Advertising Brochure.
Lawn Technology Ltd. Advertising Brochure.
Princeton Self-Propelled Sod Harvester Advertising Brochure.
Princeton "Quick-Hitch" Pull-Type Sod Harvester Advertising Brochure.
Princeton "Tow-Boy" Pull-Type Sod Harvester Advertising Brochure.

*Primary Examiner*—David H. Corbin
*Assistant Examiner*—Spencer Warnick
*Attorney, Agent, or Firm*—Barnes & Thornburg

[57] ABSTRACT

A sod harvesting apparatus is provided a means for locomotion, a means for cutting sod into strips and curling it into rolls, and means for stacking the sod rolls onto an awaiting pallet. The apparatus includes a frame which supports orthogonal axes. A conveyor assembly is mounted on the x-axis, and transports sod rolls placed thereon to a mechanical hand unit. The x-axis provides the conveyor assembly with one-dimensional translation with respect to the frame. The mechanical hand unit, which is attached to the conveyor assembly, is capable of one-dimensional translation along the x-axis with respect to the conveyor assembly. The mechanical hand unit is rotatably mounted onto the x-axis so that it can place a sod roll in any desired orientation onto the pallet. The mechanical hand unit lifts the sod roll off the conveyor assembly and transports the roll to an awaiting pallet. The pallet is supported by a z-axis assembly, which is comprised of a plurality of forks and a lift mechanism. The z-axis permits movement in a generally vertical direction and allows the pallet resting thereon to be lowered to the ground. The z-axis is also connected to a y-axis, which allows the assembly one-dimensional translation which is transverse to both the x-axis and the z-axis. A pallet injection unit is attached to the y-axis and supplies the z-axis with empty pallets as is required. A pallet magazine is attached to the frame, and can store several pallets at a time.

14 Claims, 3 Drawing Sheets

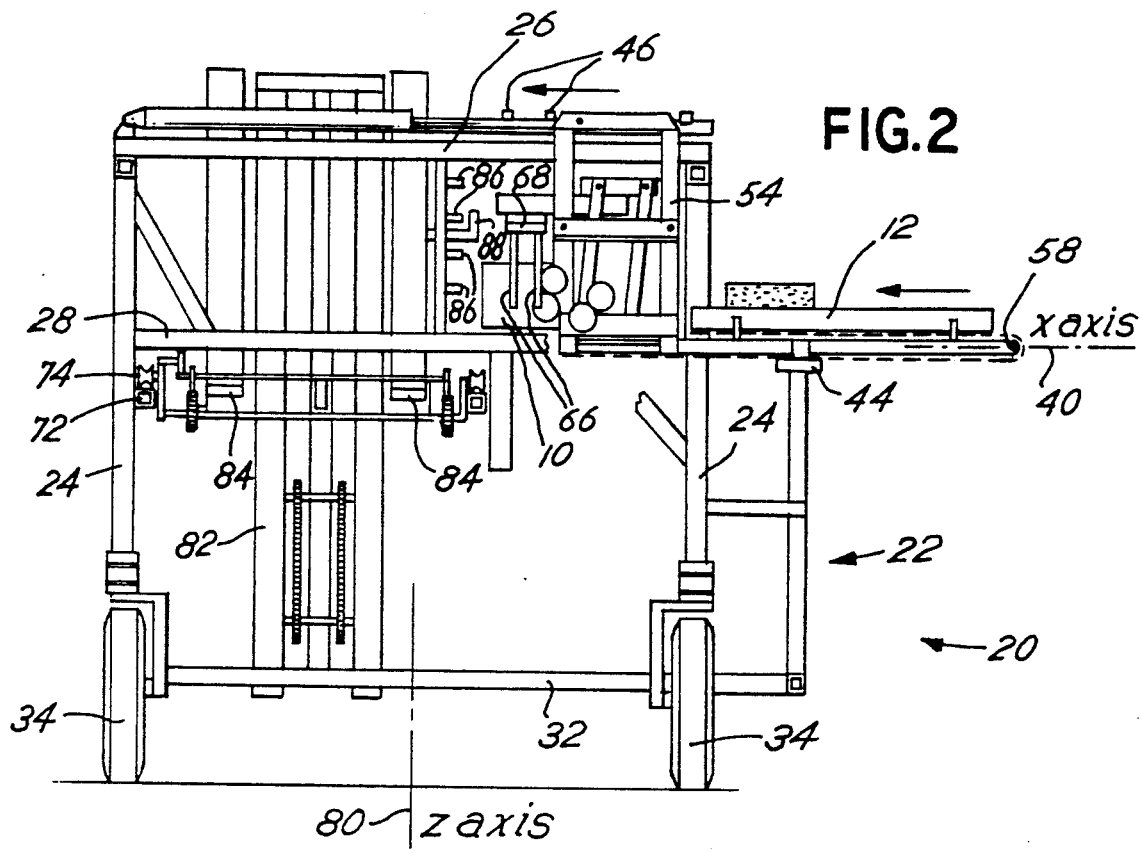

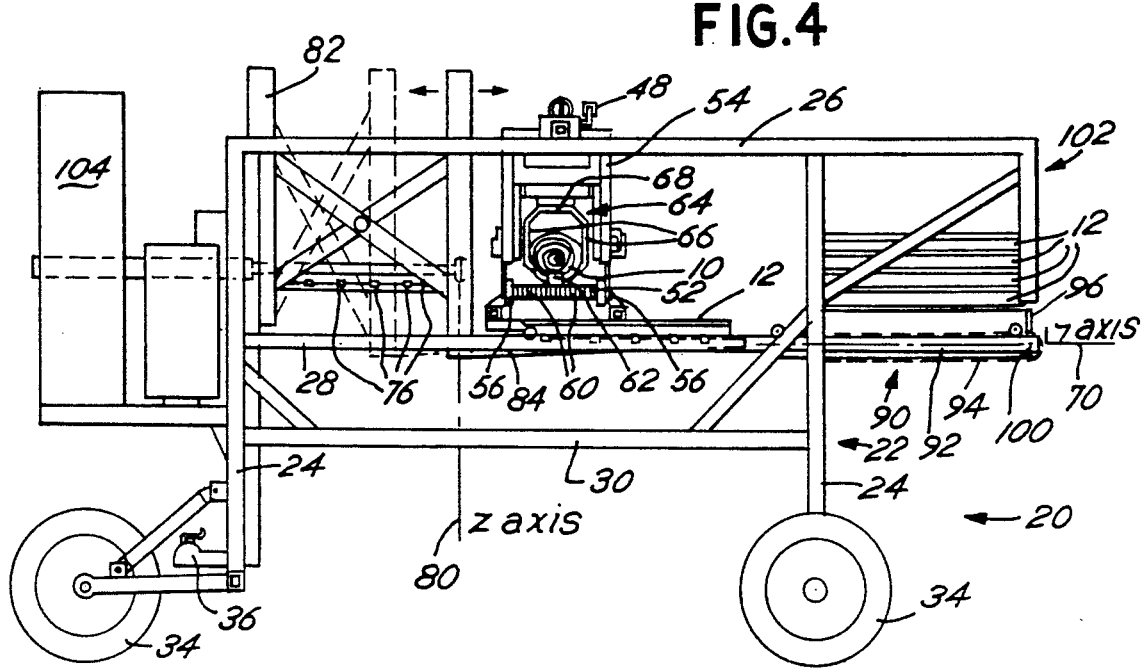
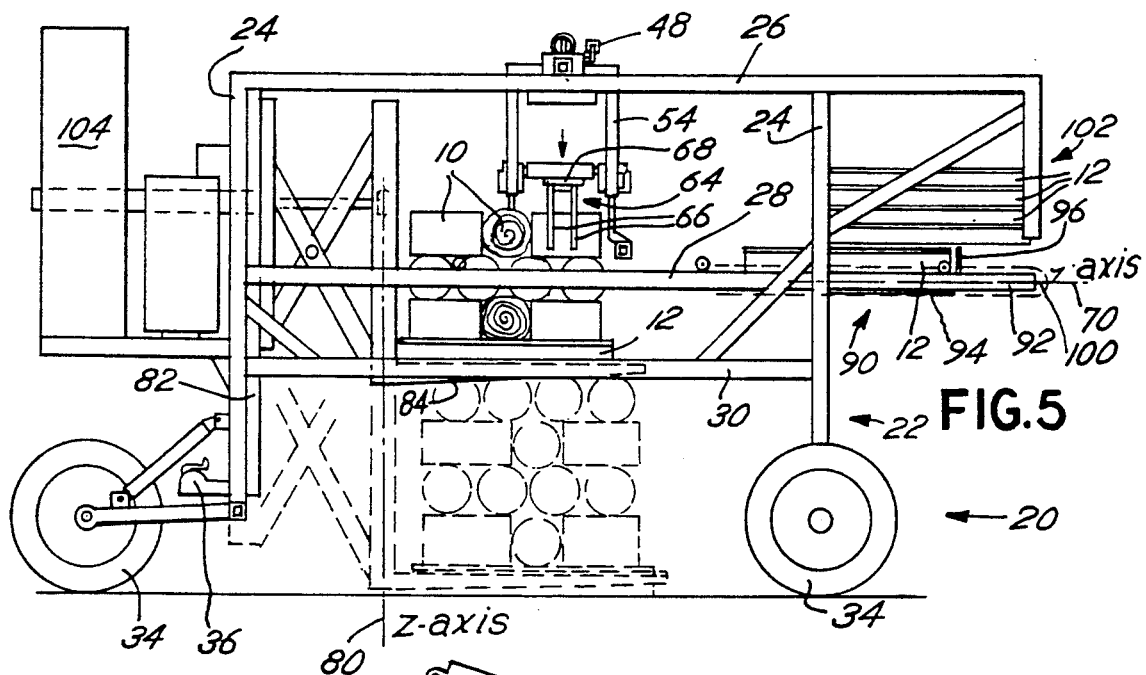
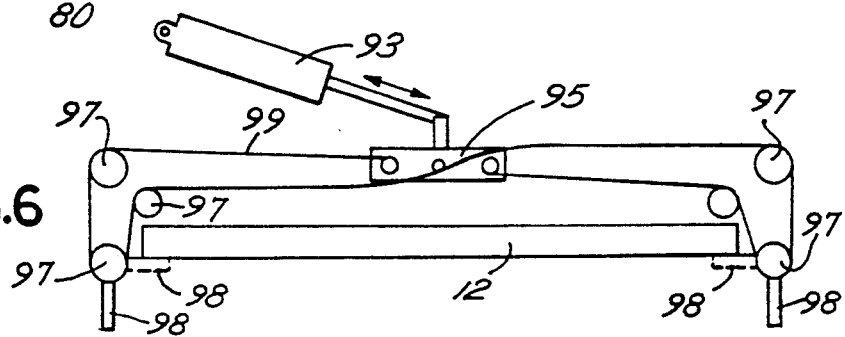

AUTOMATED SOD HARVESTING APPARATUS

BACKGROUND AND SUMMARY OF THE INVENTION

The present invention relates generally to new and novel apparatuses for harvesting sod. More particularly, the present invention relates to automated sod harvesting apparatuses which automatically transport and position rolls of sod in a preselected pattern onto pallets.

Sod is becoming an increasingly popular means of ground cover, both for residential and for commercial purposes. There are many instances when a lush field of grass serves as the perfect ground cover. To achieve such a lawn, many people believe that planting grass seed is the most effective and efficient means. However, there are a number of problems which can prevent grass seed from growing into a full field of grass. One such problem is, of course, the weather. Different grass seed varieties require different weather conditions in which to thrive. Thus, one must know whether the grass seed being planted is adaptable to the surrounding weather patterns. Furthermore, the unpredictability of the weather makes planting grass seed guesswork at best. Grass requires a certain amount of water and sunlight to take root and grow. Once the seed is planted, one is at the mercy of nature to provide the requisite amounts of water and sunlight.

In addition, certain species of grass seed are more adaptable to the climate in different geographic regions. It is not always possible to know if the grass seed obtained corresponds to the climate it is to be planted in. Whether or not a particular species of grass will readily grow in its environment is largely a function of geography. Some grass species thrive in cool, wet climates while others grow best in hot, arid climates. Cool season grasses are grown generally in the northern states and in Canada. These grasses generally grow best during the cool spring and fall seasons, and less during the hot, dry summers. Once harvested as sod, these grasses can easily be formed into rolls and then transported to their place of laying. Kentucky bluegrass is a common, widely-used cool season grass. Warm season grasses are common in Florida and throughout the south. These grasses thrive in the hot climate. However, when these varieties of grass are out into strips of sod, they cannot, as a general rule, be formed into rolls. Bermuda grass is a typical warm season species.

Another drawback of planting grass seed is that the seeds require time to grow into a full, lush lawn. In fact, it may take many seasons before the lawn is completely full and thriving. This is important in two respects. First, of course, one cannot enjoy a beautiful green lawn as soon as the seeds are planted. Owners of both residential homes and commercial complexes are anxious to enjoy a green field of grass. If grass seed is planted, it may take months or even years for the lawn to be healthy and full. Second, and perhaps more important, while grass seed is growing, the underlying soil is not protected from the erosive effects of wind and water. This is especially true when grass seed is planted on rolling, sloping terrain. New grass is often needed after the completion of large-scale construction, as in the repair or construction of a stretch of road or highway. Grass seed is often planted in the earth adjacent to the road as it slopes down into a median or to the countryside. While this grass is beginning its growth, the underlying earth is subject to erosion.

All of these problems are contributing factors to the increasing popularity of the use of sod. Grass seeds are chosen and planted, and nurtured into maturity on sod farms. When the grass is green and lush, the sod is harvested. Harvesting machines cut the sod into strips and, depending on the species of grass being harvested, curl the strips into rolls. The rolls are then lifted and stacked onto pallets by sod workers. The sod rolls can then be transported, unrolled and placed end to end and side by side at the desired location. As the grass roots are already strong and mature, the grass will usually thrive in its new environment. The roots soon grow between the strips of sod and the lawn quickly becomes full and complete. Since the sod is already a full and complete ground cover, it prevents erosion of the underlying soil.

Several devices have been utilized to harvest sod; that is, cut the sod at a predetermined depth into strips and lift it from the ground. Once the sod is cut, it is often beneficial to form the sod into rolls. This facilitates the handling and transportation of the sod to its new location. Several devices have been utilized to curl strips of sod into rolls. Examples of such devices are shown in U.S. Pat. No. 3,164,211 to Scott, and U.S. Pat. No. 4,944,352 to Brouwer, et al. Often, the device used to form sod rolls is integrated into the sod cutting machine.

Once the sod is cut and formed into rolls, the rolls are then prepared for transportation. As noted earlier, many warm season grass varieties cannot be rolled. Once cut into strips, these varieties are simply stacked onto a pallet and then shipped to their destination. Most cool season grass species can be rolled without damaging the grass. Forming the sod strips into rolls makes it easier to handle the sod, and easier to stack onto a pallet. While there is no single industry custom, many farmers will stack sod rolls into a pallet in a cross-hatch configuration. Using this cross-hatch design, several layers of sod may be loaded onto a single pallet.

One current industry practice is to place ten rolls of sod per layer onto a square pallet. Four rolls of sod are placed side by side on two opposite ends of the pallet. Two rolls laying end to end are placed in between the two rows of four, transverse to them. The next layer is positioned in a similar fashion, except that, viewed from above, the orientation is rotated 90°. This is repeated two more times until there are four layers of ten rolls. The fifth layer utilizes six rolls of sod. These six rolls of sod rest in the six gaps between sod rolls produced by the two rows of four rolls. The sixth and final layer contains four rolls which rest in the gaps of the six-roll layer. Thus, the fully loaded pallet is generally cubical in configuration, with a tapered top portion.

Another current industry practice is to place twelve or fifteen rolls of sod per layer onto a rectangular pallet. In such an arrangement, three sod rolls are placed end to end across the width of the pallet at one end. Depending upon the length of the pallet, and the size of the sod rolls, additional sod rolls are placed side by side to form three rows, each row containing either four of five rolls of sod. The next layer is positioned in a similar fashion except that, when viewed from above, the orientation is rotated 90°, thus forming four or five rows of three rolls of sod each across the width of the pallet. A third layer is added, the configuration of which is identical to the first layer, and a fourth layer, identical to the second layer, is also added. The fifth layer utilizes nine or twelve rolls of sod respectively when the rows are four and five rolls of sod in length. These nine or twelve rolls of sod are placed in the gaps of the preceding layer. A sixth layer is then added which consists of six or eight rolls which are again placed in the gaps of the preceding layer The previously mentioned devices cannot position the rolls of sod into a desired configuration on a pallet automatically. These devices require people manually lifting the rolled sod and placing the sod rolls in its proper position on the pallet to achieve a desired stacking arrangement. This results in additional labor costs, and reduces the consistency of stacking from layer to layer and pallet to pallet due to human error and fatigue.

Thus, an object of the present invention is the provision of automated sod harvesting apparatuses which can stack sod rolls onto pallets into layers of preselected orientation.

Another object of the present invention is to provide automated sod harvesting apparatuses which can stack sod rolls into multiple layers onto a single pallet.

Still another object of the present invention is to provide automated sod harvesting apparatuses which do not require human assistance in arranging the sod rolls onto the pallets.

A still further object of the present invention is to provide automated sod harvesting apparatuses which can be adapted to fit existing sod harvesting machines.

Yet another object of the present invention is to provide automated sod harvesting apparatuses which are computer controlled.

Yet still another object of the present invention is to provide automated sod harvesting apparatuses which operate effectively and efficiently at differing tractor speeds.

These and other objects of the present invention are attained by the provision of an automated sod harvesting apparatus having a frame and a plurality of orthogonal axes therein. A conveyer apparatus is positioned on the x-axis and serves to transport the rolls of sod to a mechanical hand unit fixed to the conveyor assembly. The mechanical hand unit lifts the rolls of sod from the x-axis conveyor onto a pallet. The x-axis mechanism allows the entire conveyor to move along the path of a line parallel to the motion of the conveyor belt. A z-axis supports the pallet onto which the rolls of sod are positioned. The z-axis permits movement in a generally vertical direction, transverse to the movement of the x-axis. The z-axis comprises a plurality of forks mounted onto a hydraulic lift. When a pallet is fully loaded with sod rolls, the forks on the z-axis drop to the ground and the tractor drives away from the fully loaded pallet.

The hydraulic lift portion of the z-axis is attached to a y-axis. The y-axis permits movement of the z-axis, and thus of the pallet thereon, in a direction transverse to both the movement of the x-axis and the z-axis. Thus, by manipulating the y-axis and the z-axis, the pallet attached to the z-axis forks can be positioned at any point in the y-z plane. This collection of points defines a plane transverse to the x-axis. After a layer of sod rolls has been stacked onto the pallet, the z-axis lowers the pallet to allow the second layer to be stacked. This process continues until the pallet is full. A pallet injection unit which rides with the y-axis injects empty pallets into the z-axis. A pallet magazine, which can store several pallets at a time, supplies pallets for the pallet injection unit.

Other objects, advantages and novel features of the present invention will become apparent in the following detailed description of the invention when considered in conjunction with the accompanying drawings.

BRIEF DESCRIPTION OF THE DRAWINGS

FIG. 2 is a rear elevational view of the automated sod harvesting apparatus of FIG. 1 with portions of the frame cut away to show the conveyor assembly and the pallet magazine removed for purposes of clarity.

FIG. 3 is a rear elevational view of the automated sod harvesting apparatus of FIG. 1 as shown in FIG. 2, except the conveyor system and transfer head has moved to its left most position.

FIG. 4 is a side elevational view of the automated sod harvesting apparatus of FIG. 1 with a sod roll positioned on the conveyor belt.

FIG. 5 is a side elevational view of the automated sod harvesting apparatus of FIG. 1 with a sod roll being placed into position onto the pallet.

FIG. 6 is a bottom plane view of the automated sod harvesting apparatus of FIG. 1 showing the swing door supporting apparatus for the pallet to be loaded.

DETAILED DESCRIPTION OF THE DRAWINGS

Figure 1:
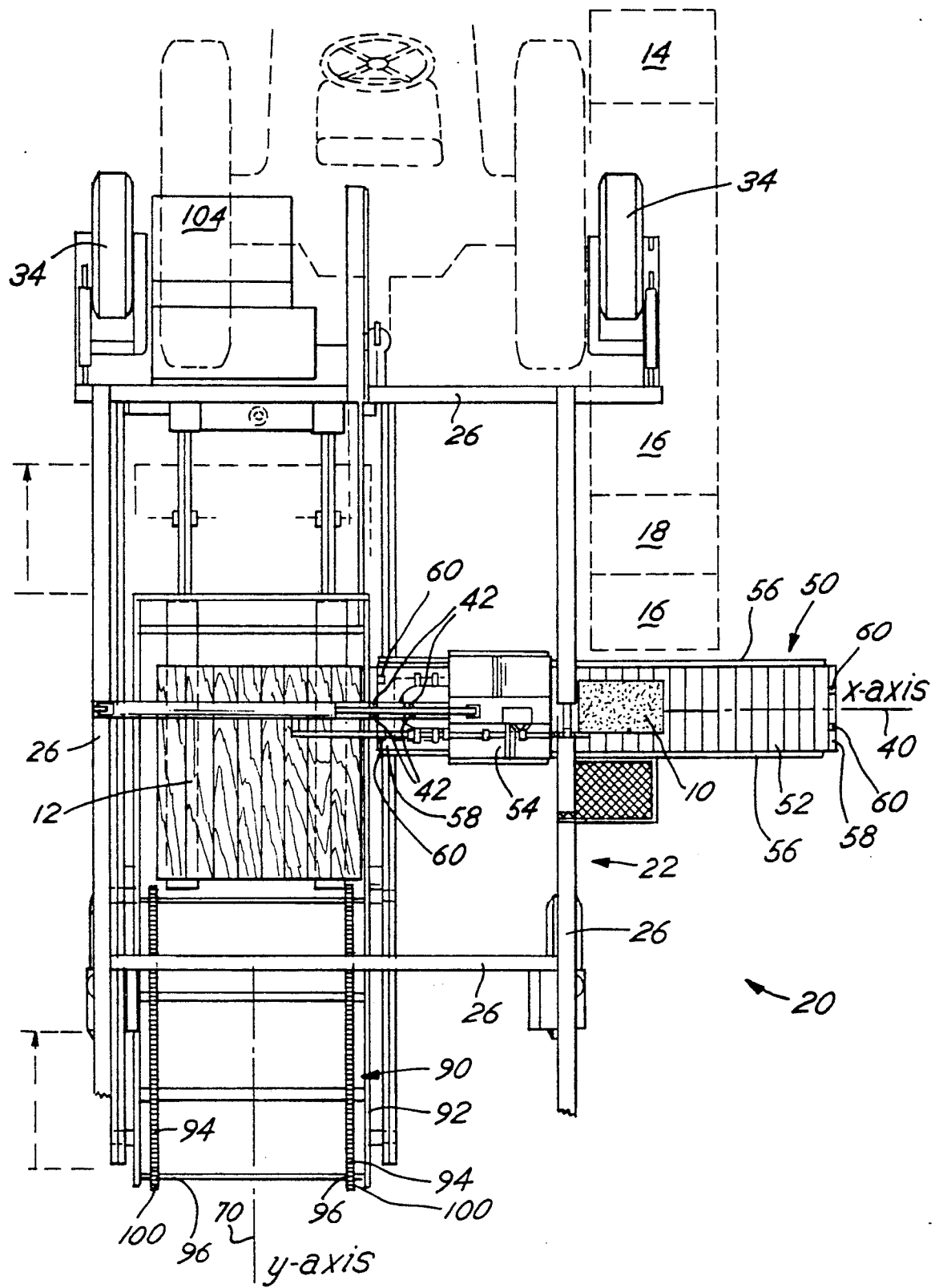
FIG. 1 is a top plane view of a preferred embodiment of a sod harvesting apparatus according to the present invention with the pallet magazine removed for purposes of clarity.

Referring now to the drawings, in which like referenced characters indicate corresponding elements throughout the several views, attention is first directed to FIGS. 1 through 6 which illustrate a preferred embodiment of an automated sod harvesting apparatus according to the present invention, indicated generally as 20. Automated sod harvesting apparatus 20 is designed to be an independent, self-driven unit. In other preferred embodiments, automated sod harvesting apparatus 20 is used in conjunction with existing sod harvesting machines such as the Brouwer sod harvester described in U.S. Pat. No. 4,345,659 to Arnold, the disclosure of which is incorporated into this application by reference thereto. However, automated sod harvesting apparatus 20 is not limited to use with this particular sod harvester and could be used as a component with other sod harvesters, or as an independent self-driven unit.

Automated sod harvesting apparatus 20 includes frame 22. Frame 22 includes a skeleton network of beams and support members. In the preferred embodiment shown, frame 22 includes four vertically extending corner posts 24, as well as four upper horizontally extending cross beams 26, four intermediate horizontally extending cross beams 28, and two lower horizontally extending cross beams 30. Horizontally extending cross beams 26, 28 and 30 extend between and are attached to adjacent vertically extending corner posts 24. Frame 22 supports and unifies the other components of automated sod harvesting machine 20.

Frame 22 rides on a plurality of axles 32. Axles 32 include wheels 34 at opposite ends. It is contemplated that frame 22 further includes hitching mechanism 36 which allows automated sod harvesting apparatus 20 to be hitched to another towing vehicle. This combination of features allows automated sod harvesting apparatus 20 to be attached to and pulled by an existing sod harvesting machine such as the Brouwer sod harvester.

Frame 22 must support considerable weight, and therefore is best constructed of a strong, durable material. A sturdy, weather-resistant metal is considered to be the best material for constructing frame 22.

Frame 22 includes x-axis 40. X-axis 40 includes upper horizontally extending cross beams 26 and a plurality of rollers 42 slideably engaged with upper horizontally extending cross beam 26. X-axis 40 also includes intermediate horizontally extending cross beams 28 and bearing surfaces 44 which are slideably engaged with intermediate horizontally extending cross beams 28. Using frame 22 as a stationary origin, rollers 42 and bearing surface 44 have one-dimensional translational movement. This movement is generally parallel to the ground, and generally transverse to the direction of movement of the tractor, which powers automated sod harvesting apparatus 20.

A plurality of stops 46 are located at prescribed positions along upper horizontally extending cross beam 26 and stop sensor 48 is mounted adjacent rollers 42. Stop sensor 48 seeks out a programmed stop 46, and thus controls the translation between upper horizontally extending cross beam 26 and rollers 42. A plurality of bearing surfaces 44 are utilized. Bearing surfaces 44 not only enhance the translation of rollers 42, but also serve to support the weight of conveyor assembly 50.

Conveyor assembly 50 is permanently fixed to rollers 42. Thus, as rollers 42 translate with respect to frame 22, so does conveyor assembly 60. Conveyor assembly 60 includes conveyor belt 52 and conveyor housing 54. Conveyor housing 54 generally consists of two side rails 56 and end bars 58 at opposite ends to form a rectangular framework. Sprockets 60 are mounted on end bars 58, and end bars 58 are inserted through openings in side rails 56 to permit rotation of end bars 58, and in turn sprockets 60. A power source (not shown) powers rotation of end bars 58. Conveyor belt 52 generally surrounds conveyor housing 50 and engages with sprockets 60. Thus, conveyor belt 52 continuously moves about conveyor housing 54 along its longitudinal axis. Items placed on the upper surface of conveyor belt 52 will be transported along the longitudinal axis of conveyor belt 52. At one end of conveyor housing 54 is trip mechanism 62. When actuated, trip mechanism 62 activates mechanical hand unit 64. Mechanical hand unit 64 comprises a plurality of fingers 66 which are connected at one end to base 68. Fingers 66 are allowed to pivot at their point of attachment to base 68. This pivoting of fingers 66 allows mechanical hand unit 64 to be in an open or closed position. In an open position, fingers 66 are spaced apart, while in a closed position fingers 66 come together and meet at their ends opposite base 68. In use, sod roll 10 travelling along conveyor belt 52 will contact and trigger trip mechanism 62. This causes mechanical hand unit 64 to close, thus grabbing sod roll 10.

As fingers 66 close around sod roll 10, mechanical hand unit 64 lifts sod roll 10 off conveyor belt 52. Mechanical hand unit 64 is attached to conveyor assembly 50. However, mechanical hand unit 64 is provided with independent means of moving in the direction of x-axis 40 with respect to conveyor assembly 50. Once mechanical hand unit 64 picks up sod roll 10, it can transport sod roll 10 a prescribed distance along x-axis 40. In practice, mechanical hand unit 64 will lift sod roll 10 off of conveyor belt 52 and transport it to an awaiting pallet 12.

Mechanical hand unit 64 is further provided with means to rotate about base 68. Sod rolls 10 are positioned onto conveyor belt 52 in substantially the same orientation. Once the sod is cut, lifted and curled into rolls by the apparatus, sod rolls 10 are placed onto conveyor belt 52 lengthwise. Thus, one end of sod roll 10 actuates trip mechanism 62. The rotatable engagement of mechanical hand unit 64 onto base 68 allows hand unit 64 to pick up sod roll 10 and place it onto pallet 72 in any desired position and orientation.

Frame 22 also includes y-axis 70. Y-axis 70 is similar in construction to x-axis 40 and includes a plurality of y-axis beams 72 and a plurality of y-axis guides or rollers 74. Y-axis beams 72 are fixed to frame 22, and slideably engage with y-axis guides or rollers 74, thus one-dimensional translation is provided between the y-axis guides or rollers 74 and y-axis beams 72. With frame 22 as the origin, y-axis guides or rollers 74 produce one-dimensional translation with respect to frame 22 which is generally parallel to the ground, and also generally parallel to the direction of movement of the tractor which powers automated sod harvesting apparatus 20.

Much like upper horizontally extending cross beam 26, y-axis beam 72 includes a plurality of stops 76. Stop sensor 78 is mounted on y-axis guide 72. By aligning preselected stop 76 with stop sensor 78, y-axis guides or rollers 74 can be moved to any position with respect to y-axis beams 72 along y-axis 70.

Frame 22 also supports z-axis 80. Z-axis 80 includes hydraulic lift 82 and a plurality of forks 84 extending therefrom. Forks 84 are capable of two-dimensional translation with respect to frame 22. This motion is generally along y-axis 70 and z-axis 80, and is perpendicular to the motion defined by x-axis 40. While in the preferred embodiment shown, hydraulic lift 82 provides two-dimensional translation with respect to frame 22, other arrangements are possible. For example, hydraulic lift 82 could provide movement along z-axis 80 only, and an independent source of power used to provide motion along y-axis 70.

Z-axis 80 provides the raising and lowering motion of pallet 12 while it is being loaded with sod rolls 10. Pallet 12 rests on forks 64 while sod rolls 10 are lifted by mechanical hand unit 64 onto pallet 12. After a single layer of sod rolls 10 have been placed on pallet 12, forks 84 are lowered with respect to frame 22 a prescribed distance. This distance is governed by stops 86 located on hydraulic lift 82 and by stop sensor 88 located on frame 22. Then, a second layer of sod rolls 10 are placed onto pallet 12. Forks 84 are lowered with respect to frame 22 after each subsequent layer of sod rolls 10 are placed on pallet 12. Once pallet 12 is fully loaded, forks 84 lower to the ground. As the fully loaded pallet 12 is dropped to the ground, the tractor drives away leaving the fully loaded pallet in the field behind the tractor.

Pallet injection unit 90 is connected to and rides with y-axis guides 74. Pallet injection unit 90 includes injection housing 92, a plurality of belts 94, a corresponding injection member arm 96 for each belt 94, and swing doors 98. Because pallet injection unit 90 is fixedly attached to y-axis 70, it is subject to one-dimensional translation along y-axis 70 with respect to frame 22. Injection housing 92 is a generally rectangular frame. At the forward end of injection housing 92 above and to either side of forks 84 are mounted a pair of swing doors 98. Swing doors 98 operate in a fashion similar to bomb bay doors. Swing doors 98 are pivotably attached to intermediate horizontally extending cross beams 28, such that in the closed position, swing doors 98 are substantially parallel to x-axis 40, while in the open position swing doors 98 are generally parallel to z-axis 60.

Swing doors 98 are actuated by hydraulic piston 93 which is mounted to be moveable with y-axis guides or roller 74. When hydraulic piston 93 retracts, connection member 95 slides in relation to chain 99. Chain 99 is supported by idler sprockets 9 and swing doors 98 extend outwardly away from chain 99 below idler sprockets 97. When hydraulic piston 93 is in its retracted position, swing doors 98 extend substantially horizontally and are in position to temporarily support partially loaded pallet 12. Once forks 84 have returned into position to support partially loaded pallet 12, hydraulic piston 93 returns to its extended position, thus moving chain 99, and swing doors 98 return to a substantially vertical position. At this time, partially loaded pallet 12 is supported entirely by forks 84.

Belts 94 are mounted onto sprockets 100 within injection housing 92. Sprockets 100 are powered by an external power source (not shown) such that belts 94 are driven by sprockets 100. Each belt 94 has a corresponding injection member arm 96 extending radially therefrom. Injection member arm 96 extends outwardly away from belt 94. Pallet injection unit 90 supports an empty pallet 12 awaiting injection into swing doors 98. In this position, pallet 12 rests on injection housing 92. When an empty pallet 12 is required on swing doors 98, belt 94 turns within injection housing 92 until injection member arm 96 contacts pallet 12. Belt 94 then continues to turn, causing injection member arm 96 to forcibly guide pallet 12 onto swing doors 98.

An additional component of automated sod harvesting apparatus 20 is pallet magazine 102. Pallet magazine 102 stores several pallets 12 and supplies pallet injection unit 90 with empty pallets 12. Pallet magazine 102 is integrally attached to frame 22. After pallet injection unit 90 injects an empty pallet 12 onto swing doors 98, belts 94 cease to turn within injection housing 96. Pallet magazine 102 then places another empty pallet 12 onto injection housing 92. Empty pallet 12 then rests on injection housing 92 until it is needed for injection onto swing doors 98. At this point, belts 94 again begin to turn within injection housing 92, and the injection process is repeated.

Sod harvesting apparatus 20 includes a cutting means 14 of conventional design which cuts sod 89 into strips of predetermined size. Lifting conveyor 16 then lifts the cut sod strips from the ground and transports the sod strips to rolling means 92. Rolling means 92 can be of conventional design and rolls the sod strips into sod rolls 10. Sod rolls 10 are then further transported along lifting conveyor 16 until sod rolls 10 reach x-axis conveyor assembly 50. When used with the Brouwer sod harvester, the lifting conveyor of the Brouwer sod harvester is extended and raised so sod rolls 10 are placed onto conveyor assembly 50. Conveyor belt 52 then transports sod rolls 10 along the longitudinal axis of conveyor assembly 50. When sod rolls 10 reach and contact trip mechanism 62, mechanical hand unit 64 is activated. Fingers 66 move to a closed position, thus grasping sod roll 10. Mechanical hand unit 64 then lifts sod roll 10 and transports it into the proper position and orientation onto pallet 12. Pallet 12 is supported by forks 84. The placement of sod roll 10 onto pallet 12 is controlled by the positioning of the rollers 42 in relation to upper horizontally extending cross beam 26, as well as y-axis guide 74 in relation to y-axis beam 74. Stops 46 provided on upper horizontally extending cross beam 26 and stops 76 provided on y-axis guide 72 prescribe predetermined control of the two axes in the x and y plane. Rollers 42 are positioned in relation to x-axis 40 according to predetermined coordinates, as is y-axis guides 74 in relation to y-axis 70. Before mechanical hand unit 64 picks up sod roll 10, the x and y coordinates for positioning sod roll 10 have been programmed. The rotatable mounting of fingers 66 onto base 68 of mechanical hand unit 64 allows fingers 66 to rotate about base 68. Once fingers 66 engage sod roll 10 and sod roll 10 is lifted, mechanical hand unit 64 may rotate sod roll 10 before placing it onto pallet 12. This combination of features allows automated sod harvesting apparatus 20 to place sod rolls 10 in any desired configuration on pallet 12.

Once a single layer of sod rolls 10 are placed onto pallet 12, forks 84 are lowered by a preprogrammed distance as controlled by stops 86 located on frame 22. This allows mechanical hand unit 64 to continue placing sod rolls 10 onto pallet 12 in any desired configuration and thus form a second layer. In this manner, automated sod harvesting apparatus 20 can load several layers of sod rolls 10 upon a single pallet 12.

When pallet 12 has a full load of sod rolls 10, forks 84 are lowered until pallet 12 rests on the ground. Automated sod harvesting apparatus 20 then continues driving forward, thus leaving fully loaded pallet 12 in the field to be picked up and delivered to its destination. However, during this process, mechanical hand unit 64 continues to transport sod rolls 10. Thus, an empty pallet 12 must be provided for these sod rolls 10. Thus, as fully loaded pallet 12 is lowered to the ground, empty pallet 12 is injected into position. Belts 94 turn within injection housing 92, thus turning injection member arm 96 about injection housing 92. As injection member arm 96 contacts empty pallet 12 lying on injection housing 92, pallet 12 is pushed into z-axis 80. When an empty pallet 12 is injected into position, swing doors 98 are in a closed position and support empty pallet 12 as it is injected and while the initial sod rolls 10 are placed into position by mechanical hand unit 64. Once fully loaded pallet 12 is released from forks 84, forks 84 are raised to support partially loaded pallet 12. Swing doors 98 then pivot into the open position, allowing full vertical movement of forks 84 along z-axis 80. Thus, pallet 12 is always in position for receiving sod rolls 10. There is no need to slow automated sod harvesting apparatus 20 in the field, or delay the movements of mechanical hand unit 64 while fully loaded pallet 12 is being discharged.

The movements of the orthogonal axes, the pallet injection unit and the pallet magazine may be manually actuated. However, to maximize efficiency, preferred embodiments of the automated sod harvesting apparatus 20 are controlled by programmable controller 104. Programmable controller 104 is be programmed to position the x and y axes at preselected positions. Programmable controller 104 also controls the vertical movement of z-axis 80 and thus z-axis 80 will automatically lower once a predetermined number of sod rolls 10 have been placed on pallet 12. Programmable controller 104 is also programmed to instruct mechanical hand unit 64 when to turn sod roll 10 before placing it onto pallet 12. Pallet magazine 102 and pallet injection unit 90 can also be controlled by the programmable controller 104. The programmable controller 104 will allow the user to program the coordinates of any desired stacking arrangements and set those coordinates into programmable controller 104. Utilizing the three-dimensional orthogonal axes, automated sod harvesting apparatus 20 is thus capable of arranging sod rolls 10 in preselected three-dimensional arrangements.

From the preceding description of the preferred embodiment, it is evident that the objects of the invention are attained by the present invention. Although the present invention has been described and illustrated in detail, it is to be clearly understood that the same is by way of illustration and example only and is not to be taken by way of limitation. The spirit and scope of the present invention are to be limited only by the terms of the appended claims.

What is claimed is:

1. An apparatus for harvesting sod, comprising:
   a cutting mechanism for cutting said sod into strips of predetermined length;
   a rolling mechanism for rolling said strips cut by said cutting mechanism into rolls;
   a conveyor mechanism for transporting said rolls from said rolling mechanism to a position for placement on a pallet;
   a mechanical hand unit for lifting said rolls from said position for placement on a pallet and transporting said rolls along a first horizontal axis for placement of said rolls on a pallet;
   a pallet support mechanism for positioning said pallet along a second horizontal axis perpendicular to said first horizontal axis to allow said mechanical hand to position said rolls at any preselected location on said pallet;
   said pallet support mechanism positions said pallet along a third vertical axis perpendicular to said first horizontal axis and said horizontal axis second horizontal axis to allow said rolls to be positioned on said pallet in multiple layers;
   a programmable controller for controlling said mechanical hand unit and said pallet support mechanism;
   said mechanical hand unit comprises a plurality of fingers which are pivotably attached to a base;
   said pallet support mechanism includes a plurality of forks and a lift mechanism;
   said lift mechanism lowers said pallet to the ground for releasing said pallet from said lift mechanism;
   each of said first horizontal axis, said second horizontal axis, and said third vertical axis include a plurality of stops and a stop sensor;
   an injection unit for injecting said pallet onto said pallet support mechanism; and
   said injection unit comprises a housing, a plurality of injection belts mounted within said housing, a plurality of corresponding injection arm members mounted on said injection belt, said injection arm members extending outwardly from said injection belts and a plurality of swing doors pivotably connected to said housing.

2. The apparatus according to claim 1, further including a pallet magazine attached to said injection unit for supplying said pallets to said injection unit.

3. An apparatus for harvesting sod, comprising:
   a power source for transporting said apparatus;
   a cutting mechanism for cutting said sod into strips of predetermined length;
   a rolling mechanism for rolling said strips cut by said cutting mechanism into rolls;
   a first conveyor assembly for lifting said strips from said cutting mechanism to said rolling mechanism;
   a mechanical hand unit for lifting said rolls onto a pallet;
   a second conveyor assembly for transporting said rolls from said rolling mechanism to said mechanical hand unit;
   a pallet support means for supporting a pallet while it is being loaded with said rolls;
   orthogonal axes, including a x-axis, a y-axis, a z-axis, and a fixed origin, which allow said pallet support means and said mechanical hand unit to define a three-dimensional space;
   a plurality of stops located at prescribed locations on said orthogonal axes for providing the desired location of each axis with respect to said origin;
   said second conveyor assembly translates along said x-axis to provide said conveyor assembly with one-dimensional movement along said x-axis with respect to said origin;
   said mechanical hand unit is connected to said second conveyor assembly for lifting sod rolls from said second conveyor assembly to said pallet support means;
   said mechanical hand unit further comprises a base and a plurality of fingers pivotably attached to said base such that said fingers define an open and a closed position; and
   said second conveyor assembly further comprises a trip mechanism which activates said fingers into a closed position and signals the lifting of said mechanical hand unit.

4. The apparatus according to claim 3, wherein said base of said mechanical hand unit is rotatably mounted in relation to said second conveyor assembly, such that said base and said fingers attached thereto rotates in relation to said second conveyor assembly.

5. The apparatus according to claim 4, wherein said pallet support means includes a plurality of forks attached to a lift mechanism.

6. The apparatus according to claim 5, wherein said pallet support means is attached to said Y-axis and said Z-axis, so as to allow movement of said pallet support means along said Y-axis and said Z-axis, transverse to said X-axis.

7. The apparatus according to claim 6, wherein said orthogonal axes are further provided sensors to correspond with said stops and provide proper positioning of said axes with respect to said origin.

8. The apparatus according to claim 7, wherein said Z-axis lowers to the ground, thus placing a loaded pallet resting thereon onto the ground and allowing said apparatus to drive away from said loaded pallet.

9. The apparatus according to claim 8, further including a pallet injection unit for injecting an empty pallet into said Z-axis, while said z-axis is lowering a loaded pallet to the ground.

10. The apparatus according to claim 9, wherein said injection unit includes a housing upon which an empty pallet rests, a plurality of injection belts which turn within said housing, a plurality of corresponding injection arm members extending outwardly from said injection belts and a plurality of swing doors which temporarily support said pallet pivotably attached to said housing.

11. The apparatus according to claim 10, wherein when an empty pallet is required by said Z-axis, said injection belts turn within said housing, causing said injection arm members to contact said pallet and force it into said Z-axis where it is temporarily supported by said swing doors.

12. The apparatus according to claim 11, wherein after placing said loaded pallet onto the ground, said forks raise to support said empty pallet and said swing doors open to allow full vertical motion of said forks along said Z-axis.

13. The apparatus according to claim 12, further including a pallet magazine attached to said pallet injection unit which provides said unit with empty pallets.

14. The apparatus according to claim 13, wherein the movements of the orthogonal axes, the pallet injection unit and the pallet magazine are controlled by a programmable controller.

* * * * *